UNITED STATES PATENT OFFICE.

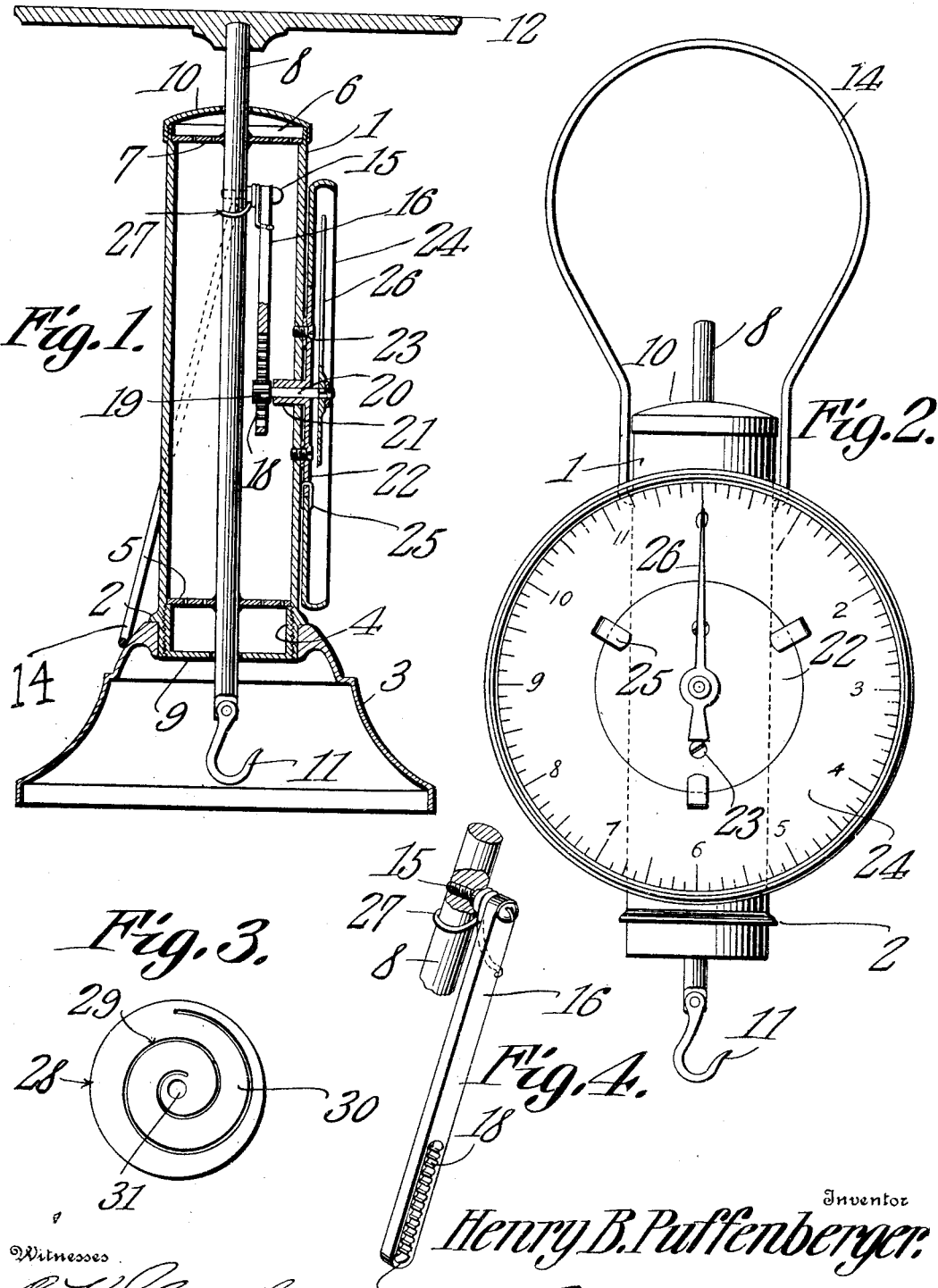

HENRY B. PUFFENBERGER, OF TIFFIN, OHIO.

SPRING-SCALE WEIGHING DEVICE.

958,172.

Specification of Letters Patent. Patented May 17, 1910.

Application filed September 20, 1909. Serial No. 518,537.

*To all whom it may concern:*

Be it known that I, HENRY B. PUFFENBERGER, a citizen of the United States, residing at Tiffin, in the county of Seneca and State of Ohio, have invented a new and useful Spring-Scale Weighing Device, of which the following is a specification.

The objects of the invention are, generally, the provision in a merchantable form, of a device of the class above mentioned, which shall be inexpensive to manufacture, facile in operation, and devoid of complicated parts; specifically, the provision of a scale adapted to be mounted, removably, upon a base, to serve as an anteriorly supported weighing device, and, at the same time, adapted to be removed from the base to serve as a superiorly supported weighing device; the provision of a spring of novel and improved construction adapted to be used in a weighing device; and the assembling of the component parts of the structure in a novel manner to form an efficient and convenient scale; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings;—Figure 1 is a vertical longitudinal section of the scale, the same being mounted upon its supporting base; Fig. 2 is a front elevation of the scale, the same having been removed from the base and adapted to be used as a suspended weighing device; Fig. 3 is a top plan of one of the springs; Fig. 4 is a fragmental perspective designed to show the arm, and the means whereby the same is connected with the scale bar.

In carrying out my invention, I provide primarily, a tubular casing 1, provided, adjacent its lower end, with a circumscribing shoulder 2, adapted to contact with the upper end of a base into which the case 1 is adapted to be removably inserted. Mounted in the lower end of the case 1, is a sleeve 4, supporting upon its upper edge, the lower spring 5, the same being secured in any desired manner to the wall of the case 1. The upper end of the case 1 is cut away to form a shoulder 6 extending into the interior of the case, and upon this shoulder 6 is mounted the upper spring 7, the spring 7, like the spring 5, being secured to the wall of the case 1.

Axially mounted in the case 1, and adapted to reciprocate longitudinally therein, is a scale bar 8, which is secured to the springs 5 and 7. The scale bar 8 extends terminally beyond the case 1 and carries upon its upper end, removably, a platform 12, the lower end of the scale bar 8 being provided with a pivotally mounted suspension member, in the present instance shown in the form of a hook 11, the length of the hook 11 being such that it is adapted to be held within the base 3, without coming in contact with the counter, or other support, upon which the base 3 sets. The bottom 9 of the sleeve 4 is provided with an axial opening to receive the scale bar 8, and the lid 10 which is mounted upon the upper end of the case 1 is provided with a similar opening, the members 9 and 10 thus serving to receive the scale bar for reciprocation. A bail 14 is pivotally connected with the case 1, and adapted to descend in an out-of-the-way position, as shown in Fig. 1. The scale bar 8 is provided with a radially extending pintle 15, upon which is pivoted an arm 16, provided at its lower end with a slot 17 adapted to inclose a pinion 19 which is secured to the inner end of a shaft 20. The arm 16, in one of the side walls of the slot 17, is provided with a rack 18 adapted to mesh with the pinion 19, the engagement between the rack 18 and the pinion 19 being maintained, when the device is in operation, by means of a spring 27, the intermediate portion of which is wrapped about the pintle 15, one end of the spring being in engagement with the scale bar 8, the other end thereof being in engagement with the arm 16, below the point of suspension.

Secured to the outer face of the case 1, is a plate 22, provided with a bearing 21, in which the shaft 20 is journaled for rotation. The plate 22 may be secured to the case 1 by means of screws 23 or other common means adapted to a like end. Surrounding the plate 22 and located in a common plane therewith, is an annular dial 24, the plate 22 being provided with clips 25, adapted to hold the dial 24 against displacement from the plate 22, without, however, interfering with the rotation of the dial 24 upon the plate. The outer end of the shaft 20 carries a hand 26, coöperating with graduations upon the dial, to indicate the weight.

Referring to Fig. 3, wherein, the springs 5 and 7 are shown in detail, it will be seen that these elements are fashioned from a flat plate 28, provided with a spiral slot 29, located entirely within the contour of the plate, and determining, within the plate, a spiral tongue 30, the extremity of which is provided with an opening 31, adapted to receive the scale bar 8.

The operation of the device is as follows:—Referring to Fig. 1, it will be seen that when the article to be weighed is superposed upon the platform 12, the scale bar 8 will move longitudinally within the case 1, the tongue 30 of the springs 5 and 7 being drawn downwardly and the members 9 and 10 serving as guides to direct the movement of the scale bar 8. While the scale bar 8 is thus being depressed the spring 27 will hold the rack 18 in mesh with the pinion 19, causing a rotation of the shaft 20, whereby the hand 26 will indicate the weight upon the dial 24. If desired, the bail 14 may be seized, the platform 12 being removed, and turned upwardly into the position shown in Fig. 2, the case 1 being lifted and the base 3, the hook 11 then being operated to suspend the article which is to be weighed.

By mounting the dial 24 rotatably upon the plate 22, it is possible to move the dial, for the purpose of setting off tare. By inclosing the pinion 19 within the slot 17, should the spring 27 break, the device would still operate, although, obviously, less satisfactorily owing to the friction between the teeth of the pinion 19 and the smooth wall of the slot 17. The form given to the springs 5 and 7 is noteworthy, since thereby an inexpensive yet efficient resilient member is produced. It is considered of advantage, that the slot 29 is located entirely within the contour of the plate 28, since, by this construction, the periphery of the plate is maintained unbroken, thereby making more secure, the mounting of the springs 5 and 7 within the case 1.

From the foregoing, it will be seen that there is provided a simple and efficient scale, adapted to fulfil a wide variety of requirements.

Having thus described my invention, what I claim as new, and desire to protect by Letters Patent is:—

1. In a device of the class described, a case; a flat plate secured transversely in the case and having a slot terminating within the contour of the plate and determining a spiral tongue within the plate; and weighing mechanism connected with the end of the tongue.

2. In a device of the class described, a case; springs connected with the interior of the case adjacent the ends thereof; a scale bar extended axially through the casing and secured to the springs; a base arranged to receive removably, one end of the case; a suspension member secured to one end of the scale bar and arranged to be housed within the base; a platform removably mounted on the other end of the scale beam; and weight indicating mechanism operatively connected with the scale bar.

3. In a device of the class described, a case; a shaft rotatably mounted within the case, a pinion attached to the shaft within the case; an arm having a rack to engage the pinion; a scale bar mounted for reciprocation in the case, a pivot element connecting the arm with the bar; a resilient member having its intermediate portion wrapped about the pivot element between the arm and the bar, one end of the resilient member being engaged by the bar, and the other end thereof being engaged by the arm to hold the rack in mesh with the pinion; weight receiving means carried by the scale bar; and weight indicating means connected with the shaft.

In testimony that I claim the foregoing as my own, I have hereto affixed my signature in the presence of two witnesses.

HENRY B. PUFFENBERGER.

Witnesses:
F. R. MANN,
GEO. N. YOUNG.